HENRY MARKLE.
Improvement in Miter Boxes.

No. 115,752.

Patented June 6, 1871.

Witnesses:
H. J. Wilson
Geo. W. Jones

Inventor:
Henry Markel.

115,752

UNITED STATES PATENT OFFICE.

HENRY MARKLE, OF SPENCER, INDIANA.

IMPROVEMENT IN MITER-BOXES.

Specification forming part of Letters Patent No. 115,752, dated June 6, 1871.

*To all whom it may concern:*

Be it known that I, HENRY MARKLE, of Spencer, in the county of De Kalb and State of Indiana, have invented certain new and useful Improvements in Miter-Box; and I do hereby declare that the following is a full and exact description thereof, reference being had to the accompanying drawing and to the letters of reference marked thereon, in which like letters refer to like parts in the different figures.

The nature of my invention consists in the construction of an apparatus by which miters of any desired angle may be formed—not only miters, but compound miters of every description.

Figure 1:
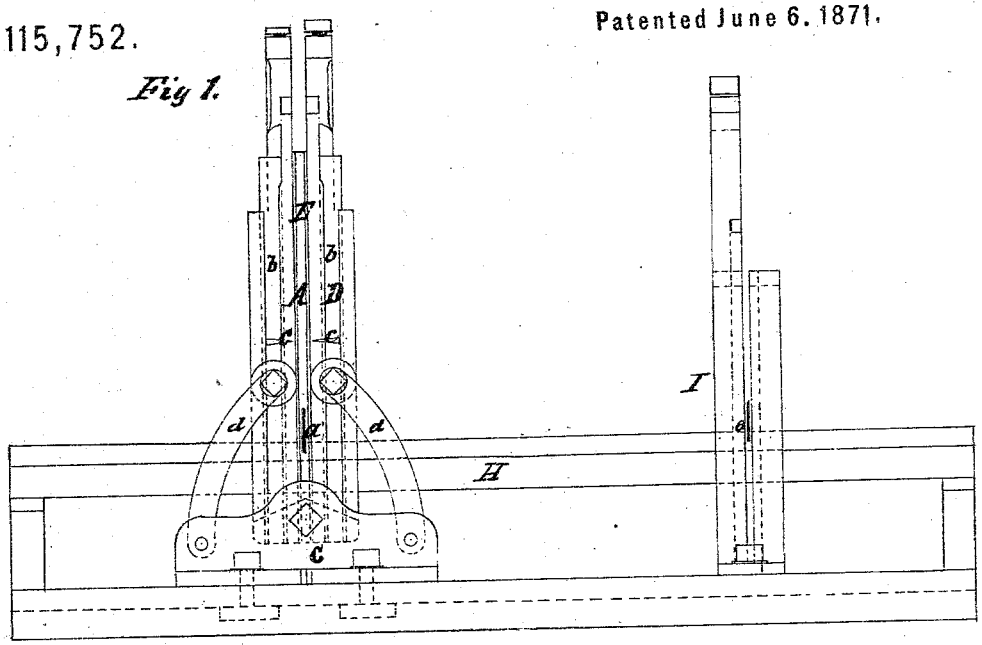
Figure 2:
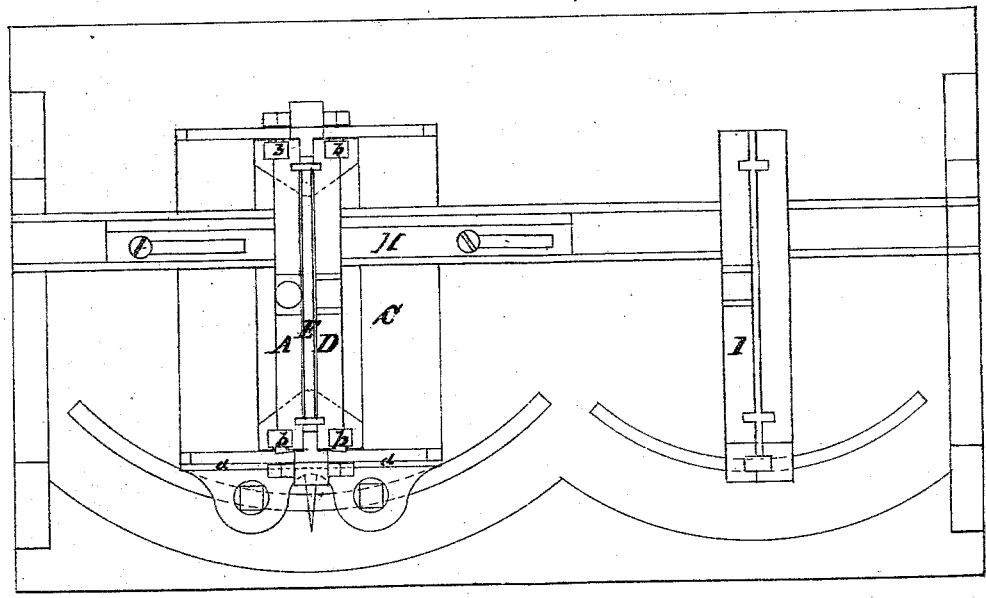

In the drawing, Figure 1 represents a side elevation. Fig. 2 represents a plan view.

I will describe its construction and operation: A represents an adjustable apparatus, which is placed on a bed or base, B, and is there pivoted in a position seen in Figs. 1 and 2 in the drawing, and is so pivoted that it may be turned to any desired angle without throwing it out of center.

This apparatus is for the purpose of carrying the saw *a*, serving as a guide to keep it in line, and, at the same time, adjust its direction in the desired angle, either vertically or horizontally, at the will of the operator. Said apparatus is constructed as follows: C represents a base, pivoted, as before described, so as to be readily turned in either direction to the right or left. Upon this base, at any convenient point, is formed a projection, which enables the operator to determine the exact angle to which the apparatus is adjusted, as will be readily understood. D represents an oscillating frame or holder, which is pivoted at its lower end to base C. This frame, above the pivots, is divided in two parts, which extend upward to a sufficient height, where they are arched, so as to unite the respective sides of the frame, as will be seen in Fig. 2. The sides of this oscillating frame are so grooved and recessed out that they will admit vertical guides *b b b b*. These guides are so fitted into the frame or holder D that they slide freely in a vertical direction. They are provided with an indicator, *c c*, which gives the precise angle of adjustment. To these vertical guides are pivoted braces *d d*, the lower ends of which are pivoted to the base B. It will be observed that any oscillation of the holder D will reciprocate the guides *b b b b*, so as to compensate for its motion, as will be readily understood. In the space *f*, between the two portions of holder D, before referred to, there is inserted a saw-holder, E, to which the saw is attached, as will be hereafter described. Saw-holder E consists of two vertical slides, which reciprocate in grooves formed in the main frame, as will be seen in Fig. 2. They are connected together at their top by means of a tie arched over, for the purpose of carrying them parallel. Through suitable gains formed in the lower ends of these guides the saw reciprocates while in use. The saw may be inserted in any desirable manner. The one illustrated is thought to be the most practicable. Stops, for the purpose of preventing the elevation or depression of the saw, may be used; but those illustrated are thought to be most desirable. They consist of a vertical screw, which passes through a stop, which may, by that means, be either elevated or depressed, as the exigencies of the case may require.

Another similar stop may be used to prevent the elevation of the saw above a certain point.

H represents a table, which is positioned so as to be in the proper range to receive the material and present it to the saw for operation. This table is constructed as follows: A suitable bed, of sufficient length and breadth, is provided with flanges on the sides, which are designed for the purpose of keeping the material in position. These flanges are so recessed out as to compensate for the oscillation of the saw, as will be readily understood. In the groove thus formed by said flanges is inserted an adjustable gage, *g*, which serves to support the material to be operated upon.

The operation of my apparatus is as follows: When the operator has determined upon the desired miter he adjusts the apparatus so as to throw the saw to the desired angle, the saw being vertical. When this is accomplished the apparatus is in position to do ordinary or simple miter or bevel sawing. The work being adjusted in the proper position on the table, the saw is lowered upon the work, and a reciprocating motion is imparted to it, and the work is completed without further care, the saw being guided fully and completely, as will be understood. When compound miters are to be sawed the apparatus is adjusted, as before, to the desired angle, and then the main brace is secured in position by means of set-screws, thus securing that angle; then the set-screws of the side braces are loosened, and the holder or frame D is inclined to the right or left, as the case may require, until the proper angle is attained, when it may be secured in position by means of the set-screws in the side braces, as before, and the work may proceed. When the operator desires to saw only simple miters the apparatus may be constructed after the plan shown at I, Figs. 1 and 2, which is the same as the other, leaving out that portion of it which is necessary to the compound-miter adjustment.

What I claim as new, and desire to secure by Letters Patent, is—

The adjustable base C, hinged braces $d$ $d$, adjustable guides A and D, reciprocating saw-frame E, and saw $a$, in combination with the adjustable table H, the whole being arranged, constructed and operating in the manner and for the purpose specified.

HENRY MARKLE.

Witnesses:
H. F. WILLSON,
GEO. W. JONES.